United States Patent [19]

Schiller

[11] Patent Number: 4,723,298

[45] Date of Patent: Feb. 2, 1988

[54] IMAGE COMPRESSION TECHNIQUE

[75] Inventor: Michael Schiller, Riverdale, N.Y.

[73] Assignee: Fingermatrix, Inc., North White Plains, N.Y.

[21] Appl. No.: 716,487

[22] Filed: Mar. 27, 1985

[51] Int. Cl.$^4$ ............................................. G06K 9/56
[52] U.S. Cl. ......................................... 382/56; 382/4; 382/27; 382/50; 358/260
[58] Field of Search ..................... 382/4, 5, 27, 54, 56, 382/50, 41, 49; 358/138, 263, 260

[56] References Cited

U.S. PATENT DOCUMENTS

| | | | |
|---|---|---|---|
| 3,560,930 | 2/1971 | Howard | 382/56 |
| 3,849,760 | 11/1974 | Endou | 382/41 |
| 3,973,239 | 8/1976 | Kakumoto et al. | 382/54 |
| 3,975,711 | 8/1976 | McMahon | 382/4 |
| 4,003,024 | 1/1977 | Riganatti | 358/166 |
| 4,047,152 | 9/1977 | Giuliano | 382/50 |
| 4,184,206 | 1/1980 | Harano | 382/56 |
| 4,204,227 | 5/1980 | Gurley | 358/22 |
| 4,225,850 | 9/1980 | Chang | 364/726 |
| 4,298,895 | 11/1981 | Arai et al. | 382/54 |
| 4,356,555 | 10/1982 | Ejiri | 364/515 |
| 4,393,452 | 7/1983 | Sekigawa | 382/50 |

FOREIGN PATENT DOCUMENTS

A119574 9/1981 Japan.

OTHER PUBLICATIONS

"The Application of an Image-Compression/Feature-Transgeneration Technique to the Computer-Aided Diagnosis of Brain Tumors", K. S. Han, R. W. McLaren, G. S. Lodwick, 8/72.

Primary Examiner—Leo H. Boudreau
Assistant Examiner—A. Anne Skinner
Attorney, Agent, or Firm—McAulay, Fields, Fisher, Goldstein & Nissen

[57] ABSTRACT

An optical and electronic scan produces an image composed of binary value pixels. An automatic picture compression routine reduces the number of pixels in the image. A first stage four to one reduction in the number of pixels is achieved by treating each mutually exclusive four pixel unit as a separate set. A binary value is assigned to each four pixel set. That binary value is assigned to a single pixel in a first output image. The same process is repeated a second time to provide a final output image that has one-sixteenth the number of pixels as has the original input image. The value assigned to each four pixel unit set is a weighted function of the binary value of each of the sixteen pixels in a four pixel by four pixel subfield in which the unit set is centered. The greatest weight is give to the center pixels, that is, to the four pixels of the unit set. Lesser weight is given to the peripheral pixels. Among the peripheral pixels, lesser weight is given to the four corner pixels than is given to the eight side pixels between the corners. In the weighting process, the significance of the binary value of the sixteen pixels in the subfield is in part a function of the total pattern of the pixel values in the subfield.

14 Claims, 8 Drawing Figures

| SUBSIDIARY BOX | COMPOSED OF |
|---|---|
| A | $P_1 + P_2 + P_{c1} + P_{c4}$ |
| B | $P_2 + P_3 + P_4 + P_{c1}$ |
| C | $P_4 + P_5 + P_{c1} + P_{c2}$ |
| D | $P_{c1} + P_{c2} + P_{c3} + P_{c4}$ |
| E | $P_5 + P_6 + P_7 + P_{c2}$ |
| F | $P_{c2} + P_7 + P_8 + P_{c3}$ |
| G | $P_{c3} + P_8 + P_9 + P_{10}$ |
| H | $P_{c4} + P_{c3} + P_{10} + P_{11}$ |
| I | $P_1 + P_{c4} + P_{11} + P_{12}$ |

| PIXEL UNDER CONSIDERATION | ASSOCIATED SUBSIDIARY BOXES |
|---|---|
| $P_{c1}$ | $A + B + C + D$ |
| $P_{c2}$ | $C + E + F + D$ |
| $P_{c3}$ | $F + G + H + D$ |
| $P_{c4}$ | $H + I + A + D$ |

FIG.1

| SUBSIDIARY BOX | COMPOSED OF |
|---|---|
| A | $P_1 + P_2 + P_{C1} + P_{C4}$ |
| B | $P_2 + P_3 + P_4 + P_{C1}$ |
| C | $P_4 + P_5 + P_{C1} + P_{C2}$ |
| D | $P_{C1} + P_{C2} + P_{C3} + P_{C4}$ |
| E | $P_5 + P_6 + P_7 + P_{C2}$ |
| F | $P_{C2} + P_7 + P_8 + P_{C3}$ |
| G | $P_{C3} + P_8 + P_9 + P_{10}$ |
| H | $P_{C4} + P_{C3} + P_{10} + P_{11}$ |
| I | $P_1 + P_{C4} + P_{11} + P_{12}$ |

FIG.1A

| PIXEL UNDER CONSIDERATION | ASSOCIATED SUBSIDIARY BOXES |
|---|---|
| $P_{C1}$ | $A + B + C + D$ |
| $P_{C2}$ | $C + E + F + D$ |
| $P_{C3}$ | $F + G + H + D$ |
| $P_{C4}$ | $H + I + A + D$ |

FIG.1B

IMAGE COMPRESSION TECHNIQUE

BACKGROUND OF THE INVENTION

This invention relates in general to an image compression technique and more particularily to one which operates on a binary image of a fingerprint to reduce the size of the image and more particularily to reduce the number of picture elements (pixels) in the image.

For many fingerprint analysis purposes, it is desirable to generate an image which has relatively fine detail. In particular, in certain circumstances it is desired to generate an image from an optical and electronic scan of a finger or fingerprint that is 1,024 by 1,024 pixels. However in downstream processing, the capacity required to handle an image having over one million pixels is prohibitive in terms of cost and also tends to limit the speed of processing to an unacceptably slow level in an access identification system.

Accordingly, it is a major purpose of this invention to provide a technique for reducing the number of pixels involved in providing such an image while enhancing image quality.

When a live finger is scanned optically to provide a finger image or fingerprint image, a relatively high resolution is required to make sure that one picks up the valleys. In particular, it has been found necessary to use a scan which provides an initial image that has 7.5 mils (0.0075 inches) resolution per pixel. In order to obtain this kind of resolution, a picture image of approximately 1,024 by 1,024 pixels has been found useful. The image provided from the optical scan tends to be primarily ridge like in nature. But the relatively small valleys do adequately show. A technique is then required to filter this image so as to provide a resulting image that has approximately a 50:50 ratio ratio between ridge and valley zones. This filtering can be achieved because of the fact that the output from the array of optically responsive diodes that are used in the optical scan have a gray scale value which provides a basis for making a distinction between the high points on the ridges and the low points in the ridges.

Although a picture having approximately one million pixels is required to obtain appropriate image resolution and although a filtering technique has to be employed to convert the optically produced image into an image having a usable approximately 50:50 ratio of ridge zone area to valley zone area, it is desirable from the point of view further downstream processing to provide an image having substantially fewer pixels. The advantages of downstream processing of an image having substantially fewer pixels include the requirement for substantially less storage and more importantly the fact that the processing in verification will be substantially faster. By reducing the number of pixels in the image to one-sixteenth of those in the original input image, storage requirements are cut by a facter of sixteen and processing time is cut by a factor of sixteen.

Accordingly, a major purpose of this invention is to provide an enhanced image with a substantially reduced number of pixels.

However, it is important that the image provided have substantially as much relevant information as does the input image. Accordingly, it is a further purpose of this invention to provide a technique for compressing the size of the image without losing substantial or significant information.

It turns out that by an appropriate compression technique, a certain amount of filtering can occur which will improve the value of the image. Accordingly, a further object to this invention is to provide an image compression technique which creates an enchanced image having sufficient filtering so that downstream processing including such steps as minutia extraction, are improved. It has been found that one result of the application of this invention is that the minutia extraction technique becomes a great deal more stable when applied to the image that is compressed by the technique of this invention than when it is applied to a non-compressed image.

REFERENCE TO RELATED APPLICATION

Two co-pending applications by the same applicant have relevance to the preferred system within which the invention of this application operates. One application is Ser. No. 630,012 filed July 12, 1984, now abandoned, and entitled Direct Finger Reading. That application discloses a technique describes a system in which a fingerprint image is derived from the direct optical reading of a finger by an optical and electronic scan of the finger with a beam of coherent, colimated light. The angle of incidence of the light the interogating light beam on the finger surface being interogated is sufficently perpendicular to the finger surface so that the modulation and the reflected light beam is due to constructive and destructive reinforcement of the coherent light rather-than due to shadowing. To achieve this perpendicular relationship between the incident light beam and the surface being interogated, the interogating light beam, as well as the array of photo receptors that the receive the modulated light reflected from the finger are mounted on a frame which is rotated through an arc about an axis to the center of the finger during the interogating scanning operation. This substantial perpendicularity of plane of the interogating and reflected light beams to the surface of the finger avoids the geometric distortion that would be associated with the reading by shadowing technique. The array of charge coupled diode onto which the reflected modulated light beam is focused is linear array of 1,024 diodes. The entire linear array is interogated periodically during the scan to provide a matrix of 1,024 by 1,024 picture elements or pixels as the image of the live finger being scanned. The over one million pixels providing by this direct finger imaging technique are required in order to provide adequate discrimination between the ridges and valleys of the live finger being scanned. It is this large number of pixels in which create the downstream processing problem of storage capacity and processing time that calls for the invention of this application which serves to provide an image having substantially reduced the number of pixels.

The second related patent application is Ser. No. 679,622 filed on Dec. 7, 1984, now U.S. Pat. No. 4,685,145, and entitled Conversion Of An Image Represented By A Field of Pixels In A Gray Scale To A Field of Pixels In Binary Scale. The output of the individual cells of the photo diode array which detects the modulated light beam are anolog values which can be readily be converted to an eight bit gray scale signal by known anolog to gray scale digitial converters. Converting the eight bit gray scale to a binary scale requires a conversion process that is in effect filtering process in that determination of whether a particular pixel is to have a "1" value or a "0" is a function of comparing that pixel with the average of certain surrounding pixels. The reference patent application provides a technique of comparing the pixels whose binary value is to be determined first with a vertical mini-field through the pixel, then with a horizonal mini-field through the pixel and finially with a combined mini-field that does not have directional bias. Based upon that comparison, a best choice is made between the vertical and horizonal mini-field comparisons so that the end result is an output image having binary value pixels in which the best filtering is obtained as a function of whether the local direction of the ridges and valleys are more or less vertical or more or less horizonal. This technique provides for an improved filtered image and also by appropriate selection of a threshold for determining whether the binary value is to be a one or a zero provides an image that has an approximately even division between ridge zones and valley zones, or more specifically, between the zones having the binary value of one and zones having the binary value of zero. It is the output image from this conversion or filtering system which forms the preferred input image on which the invention of the present application is applied.

However, since the invention of the present application can be applied to a binary image no matter how derived, the disclosures of these two reference patent applications are not essential to an understanding of the instant inventions; nor are they essential to enable an implementation of the present invention. They are however components of a preferred overall system in which the present invention is one component.

BRIEF DESCRIPTION

In brief, one embodiment of this invention provides a first stage four to one reduction in the number of pixels by treating each mutually exclusive four pixel unit separately. That four pixel unit set is assigned a single binary value which is the binary value assigned a single pixel in the corresponding four to one reduction output image. The same process is repeated a second time to provide a final output image that has one-sixteenth the number of pixels as the original input image.

The value assigned to each four pixel unit set is a weighted function of the binary value of each of the sixteen pixels in a four pixel by four pixel subfield in which the unit set is centered. The greatest weight is given to the center pixels, that is, to the four pixels in the unit set. Lesser weight is given to the peripheral pixels. Among the peripheral pixels, the lesser weight is given to the four corner pixels than is given to the eight side pixels between the corners.

As to the weighting however, the significance of the binary value of the sixteen pixels in the subfield is in part a function of the total pattern of the pixel values in the subfield. A three stage value assigning process is involved in coming up with the final value that is assigned to the unit set. In a first stage, a binary value is assigned to each of nine overlapping subsets of four pixels, all within the subfield. Each of these four pixel subsidiry boxes is a two by two pixel box. Each of these nine subsidiary boxes is assigned a binary value based on the preponderant pixel value in the subsidiary box. As a second stage, the four subsidiary boxes which are associated with a particular one of the center pixels are grouped and based on their average value, an assigned binary value is made for the associated center pixel. As a third stage, the four center pixels are treated as a group and based on the majority assigned binary value, an output binary value is assigned to the associated pixel in the output image.

BRIEF DESCRIPTION OF THE FIGURES

FIG. 1 illustrates a subfield of 16 pixels within which a unit set of four pixels is centered. This FIG. 1 subfield is scanned across the image such that each four pixel unit set Pc1 through Pc4 in the image is a mutually exclusive set. Thus, in the scanning process the sixteen pixel subfield advances to the right two columns at a time and at the end of each line of scan, advances up two lines or rows at a time.

FIGS. 1a and 1b are tables illustrating the manner in which the pixels in the FIG. 1 subfield are associated to provide the nine subsidiary boxes A through I and the manner in which those subsidiary boxes are associated in order to provide an imputed or assigned value to each of the center pixels Pc1 through Pc4.

FIG. 2A illustrates in greater detail how the sixteen inputs to the PROM 26 are developed.

FIG. 3 is of a preferred embodiment in which only one PROM 34 is necessary rather than the two PROMs 26 and 30. This reduction in PROM requirement occurs by taking into account the fact that the image compression process is timed to increment each time the scan increments two columns.

DESCRIPTION OF THE PREFERRED EMBODIMENT

Figure 2:
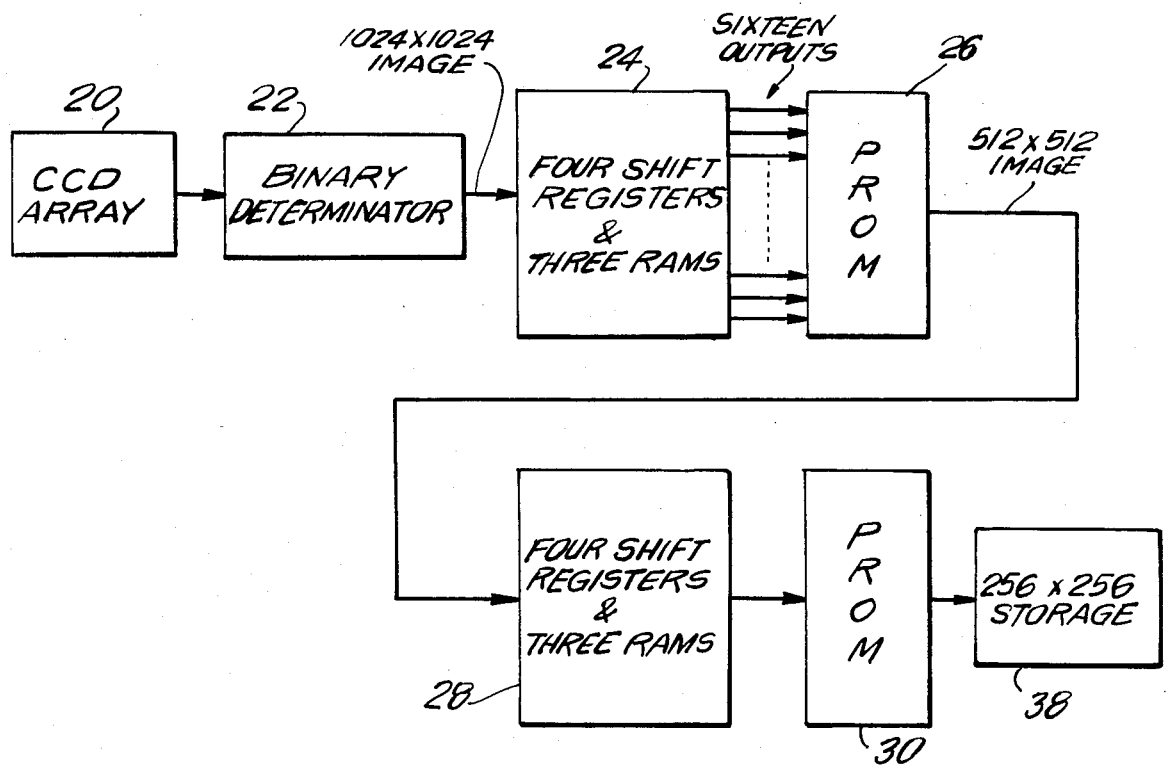
FIG. 2 is a block diagram illustrating a hard wire system for processing each FIG. 1 subfield to obtain the compressed image output.

In one embodiment of this invention, the picture compression routine reduces the number of pixels in the picture to 1/16th of the number in the input picture and thus makes the down stream processing and analysis simplier, less expensive and enables it to be more rapidly achieved.

The heart of the technique involves a first stage in which a 4 to 1 compression is achieved followed by a second stage in which a further 4 to 1 compression is achieved. Each stage is substantially similar. Thus an understanding of the first 4 to 1 compression stage will make the second 4 to 1 compression stage readily understandable.

This first 4 to 1 compression stage involves dividing the picture into sets of four adjacent pixels, each set being a box two pixels by two pixels. For each such four pixel box a binary value, either one or zero, is assigned as a function of a three stage evaluation or weighting process. This three stage process takes into account not only the binary values of the four pixels in the box but also the binary values of the twelve immediately adjacent pixels in a ring around the pixels at the center of the sixteen pixel box. The binary value assigned to the four pixel set is then assigned to a single pixel in a first output stage image; which first output image will have one-fourth the number of pixels as has the input image.

The evaluation or weighting process which takes into account the values of all sixteen of these pixels gives greater significance to the four pixels at the center of the sixteen (four by four) pixel box and gives somewhat lesser significance to the twelve peripheral pixels. As to the twelve peripheral pixels, lesser weight is given to the corner pixels than to the side pixels between the corners.

To provide the appropriate weighting and decision making as well as to provide a technique which effectly results in a filter process that improves the image, the following three stages are undertaken.

Each of the four center pixels is associated with each of four 2×2 pixel boxes. For convenience the latter boxes will be referred to herein as "subsidiary" boxes. Each subsidiary box has the pixel under consideration $P_c$ as one of its corners. Thus, the subsidiary boxes overlap.

The first stage of value determination involves assigning a binary value for each subsidiary box. The assigned binary value is determined by the majority binary value of the four pixels in the subsidiary box. Thus, if either three or four of the pixels in the subsidiary box have the binary value "1", then the value assigned to the subsidiary box is "1". However, if two of the pixels have the value "1" and the other two pixels have the value "0", then the subsidiary box has an indeterminate status and no binary value is assigned.

The second stage of value determination involves providing an assigned binary value for the pixel under consideration $P_c$ with which the four subsidiary boxes are associated. The assigned value for the $P_c$ is the majority of the assigned binary values for the four subsidiary boxes. Any subsidiary box which has been designated as indeterminate is not considered in making this assigned binary value for the $P_c$. For example, even if one subsidiary box has the binary value "0" and all three of the other subsidiary boxes are designated as indeterminate, then the $P_c$ associated with that set of subsidiary boxes will receive the imputed binary value of "0".

In this fashion, a set of subsidiary boxes is associated with each of the four center pixels $P_c$ and by means of the above stages of value determination, a binary value is imputed to each of the four center pixels $P_c$.

The third stage of value determination involves assigning a binary value to the four pixel unit. At the third stage of calculation the predominent assigned value for the four $P_c$ pixels is assigned to the four pixel unit. If there is a standoff, for example if two $P_c$'s have one value and two have the other value then it is not possible to assign a calculated value to the four pixel unit. Instead of an indefinate designation, the value of one of the four pixels is arbitrarily assigned. Since it is an arbitrary assignment it can be any one of them but to be consistant should be predetermined to be, for example, the value of the lower left of the four pixels in the subset.

In this fashion an intermediate or first output image is provided with one fourth the number of pixels as are in the input image and thus a 4 to 1 compression is achieved. Because of the particular routine followed, certain irregularities in the image are smoothed out and some of the holes in the ridge and valley structure are filled in.

By repeating the above procedure a second time, treating the first output image as the input image was treated, one can provide a final image that is reduced again to one-fourth of the pixels and thus 1/16th of the number of pixels in the input image. This final image is further improved by a filtering out of certain irregularities and holes.

Most specifically, with reference to FIG. 1, a set of four pixels Pc1 through Pc4 are shown shaded and surrounded by twelve associated pixels P1 through P12. Within this set of sixteen pixels, there are nine subsidiary two by two pixel boxes A through I which can be constructed and these are shown in the table of FIG. 1A. As indicated above, each of the subsidiary boxes is assigned a binary value, if at all possible, based on a majority of the binary values of the four pixels which constitute the subsidiary boxes A through I.

The four subsidiary boxes A through I which are associated with each of the pixels under consideration Pc1 through Pc4 having an assigned binary value. The majority binary value of those four pixels is then assigned to a pixel in a compressed image that is used to represent the four pixels Pc1 through Pc4.

As may be seen from the tables of FIGS. 1A and 1B, the corner pixels P3, P6, P9 and P12 appear only once in connection with one subsidiary box B, E, G and I. These four corner subsidiary boxes are associated only once with the pixels, such as the pixels P4 and P5, are associated (a) with a side subsidiary box such as the box C; each side box being associated with two of the pixels under consideration, and (b) with a corner subsidiary box such as the box A, which appears once in association with the pixels under consideration. As a consequence, each side pixel, such as the pixels P4 and P5, can be considered to have three times the weighting as does a corner pixel such as the pixel P3. By further contrast, the center pixels Pc1 through Pc4 may be considered to have a weighting of nine based on the Tables shown in FIGS. 1A and 1B. This is because each of the center pixels is associated not only with a number of different boxes but in particular is associated with the subsidiary box D which appears as an associated box with each of the pixels under consideration.

It should be recognized that the value of this compression procedure as a filter is enhanced by the two stage process. It is believed that by having each stage of compression provide a limited amount of filter and thus a limited amount of distortion, the combined result of the two stages is to provide a very useful and significant amount of filtering, specifically of line smoothing and hole filling, while avoiding the introduction of distortions and artifacts.

Figure 3:
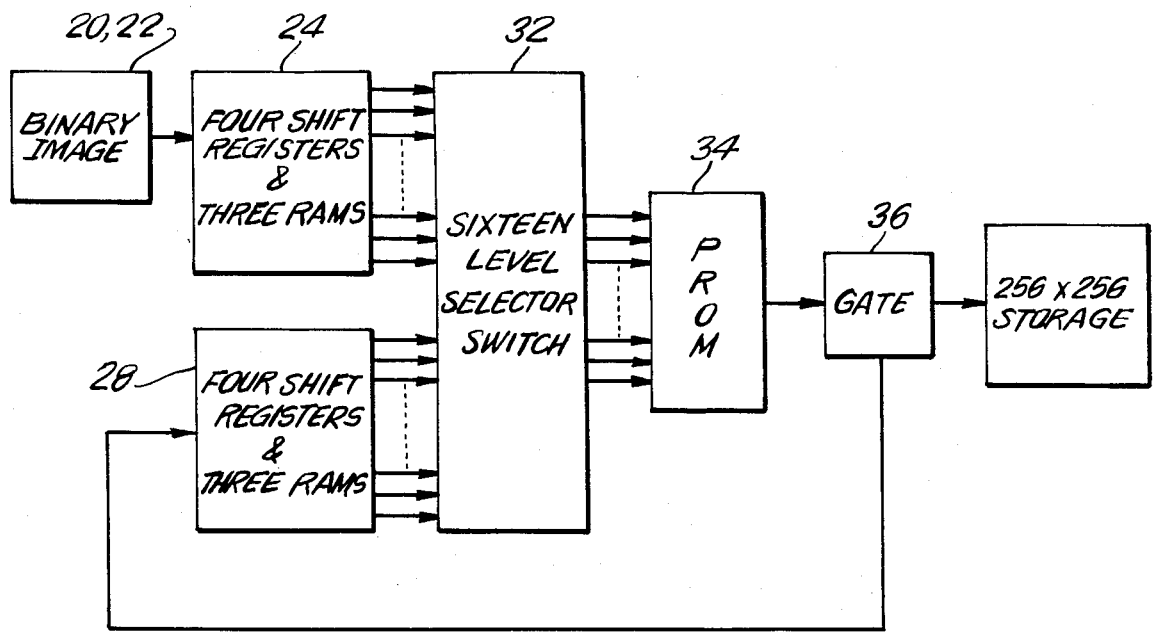
FIG. 3 is a block diagram similar to that of FIG. 2 to provide the same result as does the FIG. 2 arrangement. However
Figure 2A:
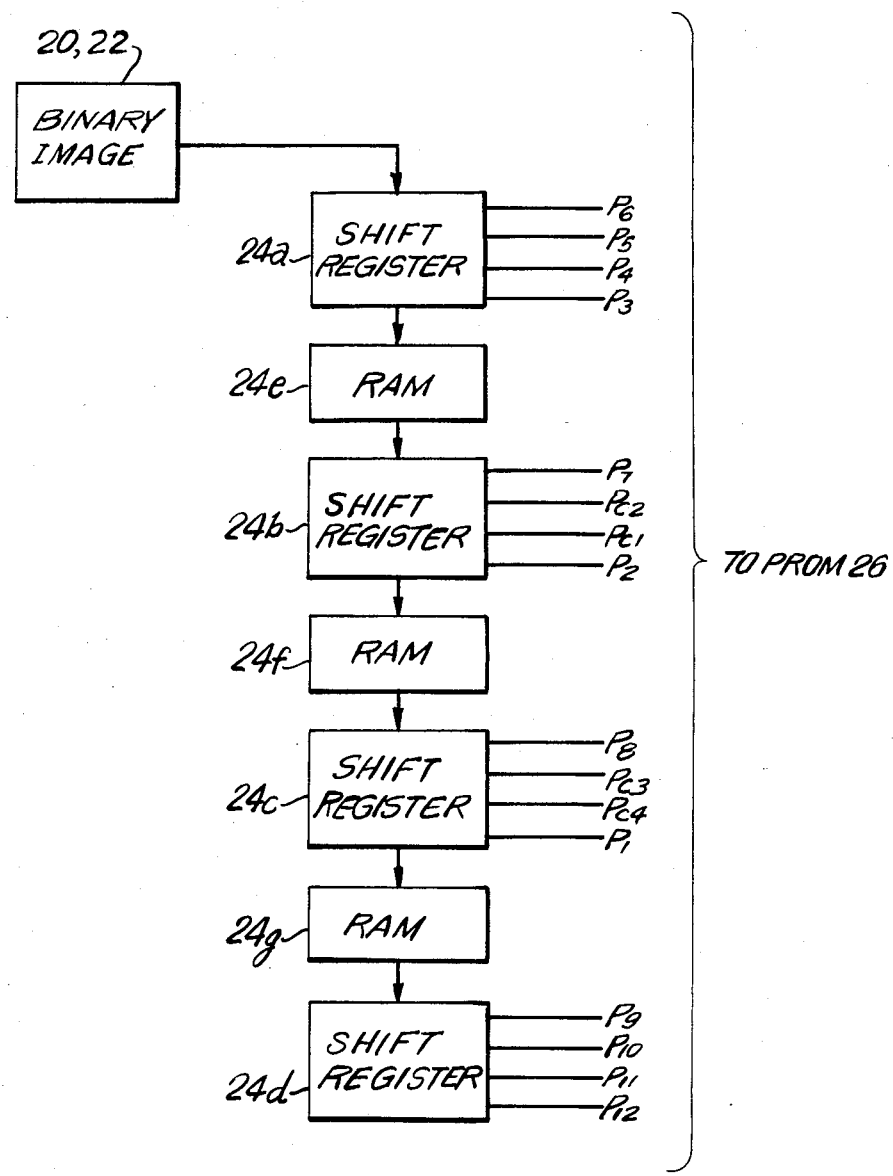
FIG. 2A is a more detailed block diagram of the multible shift register and RAM unit 24 shown in FIG. 2.

With reference to the block diagrams of FIGS. 2, 2A and 3, a CCD array 20 provides an output that is a series of pixels constituting a two dimensional image. In one embodiment, there are 1,024 by 1,024 pixels. Each of the array 20 output is in a gray scale which is converted by any one of a number of known techniques into a binary value by a binary determinator 22. The output from the binary determinator 22 is a stream of pixels representing the scene.

These pixels are applied, in sequence to a set of four shift registers and three RAMs 24, which are shown in greater detail in FIG. 2A, to provide an output of sixteen pixel values in binary form in parallel. The sixteen values represent the binary values of the sixteen pixels constituting the FIG. 1 mini-scene. The PROM 26 is programed to respond to each configuration of sixteen input bits to provide a particular binary value output. That binary value output is the value of the pixel in the first output image that represents the four center pixels of the sixteen pixel mini-scene.

As shown in FIG. 2, a further four to one reduction is obtained in a perferred embodiment by applying outputs from the first PROM 26 in sequence to another set of four shift registers and three RAMs 28 to thereby provide another set of sixteen binary values in parallel that are provided as an input to a second PROM 30. Each output binary value from the PROM 30 represents a box of four pixels in the first output image. Thus there is provided a second output image having a further four to one reduction.

Specifically, with respect to an input image that is 1,024 by 1,024 pixels, the first output image is 512 by 512 pixels and the second output image 256 by 256 pixels.

The operation of the FIG. 2 arrangement can be best understood by keeping in mind the FIG. 2A arrangement of the four shift registers and the three RAMs which constitute the unit 24. As shown in FIG. 2A there are four shift registers, 24a, 24b, 24c and 24d each having a four bit capacity. Each of the shift registers have four outputs and the sixteen outputs of the four shift register constitute the sixteen inputs to the PROM 26. The arrangement of the four shift registers and the three RAMs 24e, 24f and 24g provide for the generation of the mini-scene. Specifically, each RAM 24e, 24f and 24g has the capacity to hold 1,020 pixel values. Thus, a shift register plus a RAM has the capacity to hold a line of pixel values. Those values are either "1" or "0". The pixel values held in any one of the shift registers are the values of the four pixels which are displaced one line from the values held in adjacent shift registers. In this fashion, the four shift registers 24a through 24d together provide the binary values for a block of four by four pixels each shift register holding the values of four adjacent pixels and each shift register being displaced one line from the upstream or downstream shift register.

It might be noted that there is no provision in the system shown to compensate for the fact that the initial few lines of imagery do not provide meaningful outputs from the shift registers 24a through 24d. This simply means that the first few lines of the output image are not meaningful. The downstream processing of the image can simply take that into account, or as is more likely the case, the downstream processing will be of such a nature that the border does not have any impact on the downstream analysis process. Similarly, since the initial outputs from the PROM 26 which are fed to the shift register unit 28 are not meaningful, the initial two or three lines of the second output image will be meaningless.

From the above, it may be seen that the technique of this invention employs a subfield larger than the set of input image pixels being compressed. The subfield incorporates the set of pixels being compressed. This subfield is the basis for determining the pixel value to be assigned to an output pixel representing that set of input image pixels. The important point about the subfield is that the various pixels which constitute the subfield provide a contribution to the final value of the pixel set. The magnitude of that contribution is a function of the position of the pixel in the subfield and the total pattern of pixels in the subfield. The center pixels have the greatest weighting and thus make the greatest contribution, the corner pixels have the least weighting and make the least contribution while the side pixels have an intermediate weighting and thus make an intermediate contribution.

FIG. 3 shows a modified and presently perferred embodiment of the FIG. 2 arrangement in which by an appropriate interlacing or selection procedure, only one PROM need be employed. As may be noted from FIG. 1, when a mini-scene shifts over by one column of pixels no analysis is made because the compression involves compression of adjacent mutually exclusive two by two subsets of pixels. Accordingly, it is only when an entry is made to every other column of pixels that the PROM 34 is appropriately interogated to provide a usable output. Thus, it is possible through the use of the sixteen level selector switch 32 to switch the input to PROM 34 alternately between the outputs from the units 24 and 28. This switching will provide alternate outputs from the PROM 34 which are appropriate for the first output scene and for the second output scene. An appropriately timed gate 36 steers the PROM 34 output which is derived from the unit 24 to the unit 28 and it steers the PROM 34 output which is derived from the unit 28 to the storage unit 38 which contains the output 256 by 256 pixel image.

Thus this technique permits a particularily elegant and simplified hard wiring. A single 25K bit PROM 34 can be used. The PROM as shown in the FIGS., has sixteen address lines. These sixteen address lines correspond to the sixteen pixels that constitute the sub-field which is analyzed to provide the value for the four pixel set at the center of the sixteen pixel box. The PROM is programed to provide a given output in response to each of the 65,539 combinations of address imputs. Each address imput is either a high or low representing a one or zero value for a corresponding pixel. The output from the PROM is the value assigned to the four pixel $P_c$ set involved.

More particularily, an appropriate write signal causes the output from the PROM to terminate. The sixteen address lines shift from the sixteen pixels constituting a first sub-field to those constituting a second sub-field; those two sub-fields representing the appropriate sub-fields for contiguous four pixel $P_c$ sets. After the address lines have appropriately shifted, a read signal causes the output line to provide a pixel binary value of either one or zero for one pixel in the compressed image representing the four pixel set in the input image. This putput value from the PROM is stored in a RAM storage unit. The sixteen address lines are shifted through the input scene in accordance with the arrangement as shown in connection with FIG. 3.

Figure 4:
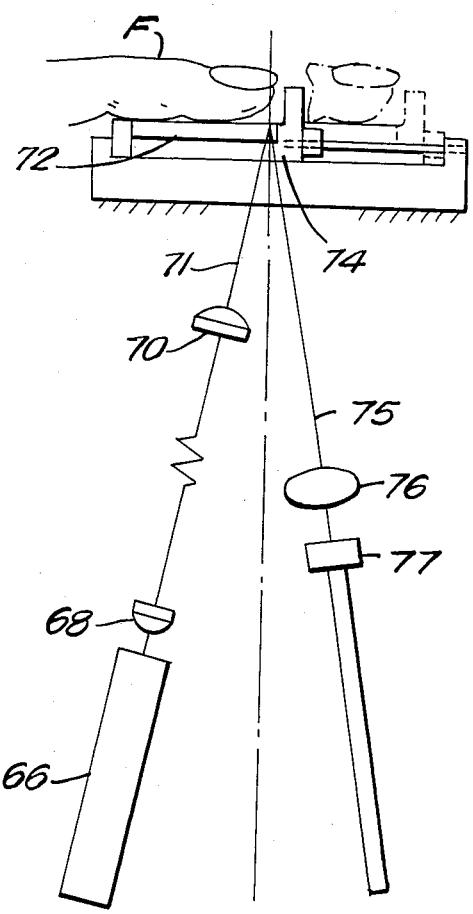
FIGS. 4 and 5 illustrate one optical and electronic scanning techinique which may be employed to provide the input image as a two dimensional field of pixels. It is this input image which is then processed by the apparatus of FIGS. 2 or 3 to provide the compressed output image.
Figure 5:
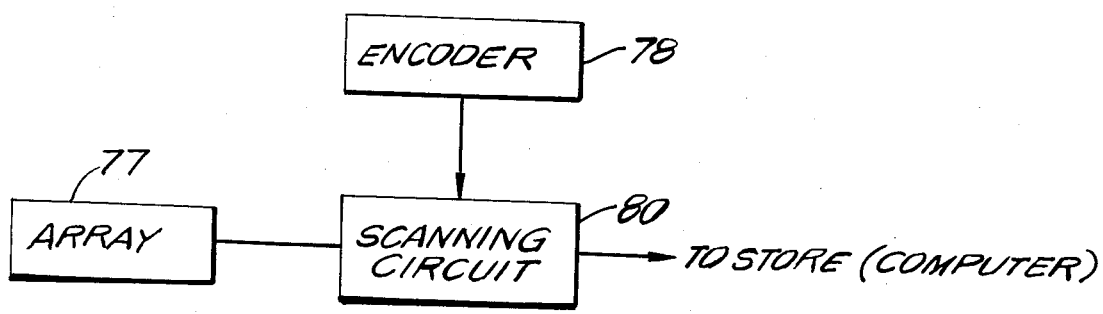

FIGS. 4 and 5 indicate a known mechanism for optically scanning a fingerprint to provide the modulated light beam input to the CCD array 20. Since it is described in the issued U.S. Pat. No. 4,322,163, the disclosure herein need not be in great detail. Suffice it, therefore, to say that a beam of light such as may be provided by a laser 66 is appropriately collimated by lenses 68 and 70 to provide the interrogating beam 71. A substantially transparent platen 62 is provided as a base on which an individual finger F may be placed. The platen 72 is mounted in a movable carriage 74 which permits moving the finger across the interrogating beam 71. As a consequence, the pattern of ridges and valleys provided at the back surface of the platen 72 causes the reflected light beam 75 to be modulated with fingerprint information. A focusing lens 76 focuses the image carred by the reflected light beam onto a linear array 77 of photo responsive diodes.

An encoder element 78 which is affixed to the carriage 74 responds to movement of carriage 76 to produce a synchronizing signal each time the carriage moves a predetermined distance. The synchronizing signal causes the scanning circuit 80 to sequentially interrogate each of the photodiodes comprising the array 77. Thus the output of the scanning circuit 80 is a train of pulses for each scan line. Each pulse represents a picture element or pixel.

It should be kept in mind that the scanning mechanism of FIGS. 4 and 5 is but one example of the finger scanning techniques with which the compression device of this invention may be used.

Thus the input to the array 20 can be the modulated light beam that is produced from a scan of a fingerprint card or the direct scan of a finger positioned in space without a platen. Indeed, it is the latter type of scan with which this invention is most useful as the direct finger scan requires the greater resolution in order to more completely distinguish the valleys.

What I claim is:

1. The machine method of automatically compressing a fingerprint image represented by a field of binary pixels comprising the steps of:
    optically imaging a finger surface or a continuous fingerprint to provide an input image of said fingerprint, said input image being a field of binary value pixels, each of said pixels having either a first value or a second value,
    designating each mutually exclusive m pixel by n pixel box in said imput image as a unit set, m and n each having a value greater than one,
    associating a subfield greater than the unit set as an associated subfield for said unit set, the unit set being centered in its associated subfield,
    assigning a binary value to each of said unit sets as a function of the number and position of the first value pixels and of the second value pixels in said associated subfield, and
    assigning said binary value of each of said unit sets as the value of a single pixel in an output image, said single pixel having substantially the dimensions of a pixel of said input image to provide said output image no more than one-fourth the size of said input image.

2. The method of claim 1 wherein said unit set is a two pixel by two pixel box and said subfield is a four pixel by four pixel box having four center pixels and twelve peripheral pixels, the associated one of said unit sets constituting said four center pixels in said subfield, said output image being one-fourth the size of said input image.

3. The method of claim 2 wherein the values of said center pixels of said associated subfield are assigned a greater weight than are said peripheral pixels of said subfield.

4. The method of claim 3 where said twelve peripheral pixels include four corner pixels and the values of said corner pixels are assigned a lesser weight than are the values of the other ones of said peripheral pixels.

5. The method of claim 1 wherein said step of assigning a binary value to each of said unit set includes at least the steps of:
    assigning a binary value to each of the pixels of said unit set as a function of the binary values of adjacent pixels in said subfield, and
    then assigning a value to said unit set as a function of said values assigned to each of said pixels of said unit set.

6. The method of claim 4 wherein said step of assigning a binary value to each of said unit sets includes at least the steps of:
    assigning a binary value to each of the four pixels of said unit set as a function of the binary values of adjacent pixels in said subfield, and
    then assigning a value to said four pixel unit set as a function of said values assigned to each of said pixels of said unit set.

7. The method of claim 1 further comprising the steps of: treating said output image as a secondary input image and repeating all of the steps of said claim 1 on said secondary input image to provide a further compressed output image.

8. The method of claim 2 further comprising the steps of: treating said output image as a secondary input image and repeating all of the steps of said claim 2 on said secondary input image to provide a further compressed output image.

9. The method of claim 5 further comprising the steps of: treating said output image as a secondary input image and repeating all of the steps of said claim 5 on said secondary input image to provide a further compressed output image.

10. The method of claim 6 further comprising the steps of: treating said output image as a secondary input image and repeating all of the steps of said claim 6 on said secondary input image to provide a further compressed output image.

11. The machine method of automatically compressing an image represented by a field of binary pixels into an output image with reduced number of pixels comprising the steps of:
    scanning a predetermined object to provide an input image consisting of a field of pixels,
    designating each mutually exclusive two pixel by two pixel box as a four pixel unit set in the input image and a single pixel in the output image,
    associating a four pixel by four pixel subfield with each of said four pixel unit sets, said unit set being centered in the sixteen pixels of said subfield,
    assigning to each of said unit sets a binary value determined by a weighted contribution from the pixels of said subfield including the pixels of said unit set within said subfield, and
    assigning said binary value of each of said unit sets as the value of a single pixel in an output image, said single pixel having substantially the dimensions of a pixel of said input image to provide said output image one-fourth the size of said input image.

12. The method of claim 11 wherein said step of assigning comprises the steps of:
    for each of the four pixels in any one of said unit sets, associating four subsidiary sets,
    each of said four subsidiary sets being a two pixel by two pixel box overlapping one another and having in common the one of said four pixels from said unit set with which said four subsidiary sets are associated,
    assigning, for each of said subsidiary sets, a binary value equal to the majority binary value of the pixels which constitute a subsidiary set to the subsidiary set, no binary value being assigned where there is no majority value,
    assigning to each pixel of said unit set a binary value equal to the majority binary value assigned to the associated four of said subsidiary sets, no binary value being assigned where there is no such majority, and
    assigning to said input image unit set, a binary value equal to the predominant assigned value of the four pixels which constitute said unit set and, when there is no such plurality value, assigning to such unit set the assigned binary value of a predetermined one of said pixels which constitutes said unit set.

13. Apparatus for automatically compressing a fingerprint image represented by a field of binary pixels comprising:
   means to optically image a finger surface or a continuous fingerprint to provide an input image of said fingerprint, said input image being a field of binary value pixels, each of said pixels having either a first value or a second value,
   means for designating each mutually exclusive m pixel by n pixel box in said input image as a unit set, m and n each having a value greater than one,
   means for associating a subfield greater than the unit set as an associated subfield for said unit set, the unit set being centered in its associated subfield,
   memory means responsive to the number and positions of the first value pixels and the second value pixels in said associated subfield to assign a binary value to each of said unit sets and to a single pixel representing each of said unit sets in an output image each of said output image pixels having substantially the dimensions of a pixel of said input image to provide an output image no more than one-fourth the size of said input image.

14. The apparatus of claim 13 wherein said unit set is a two pixel by two pixel box and said subfield is a four pixel by four pixel box, thereby containing sixteen pixels having four center pixels and twelve peripheral pixels, the associated four pixels of said unit set constituting the four center pixels in said subfield.

* * * * *